UNITED STATES PATENT OFFICE.

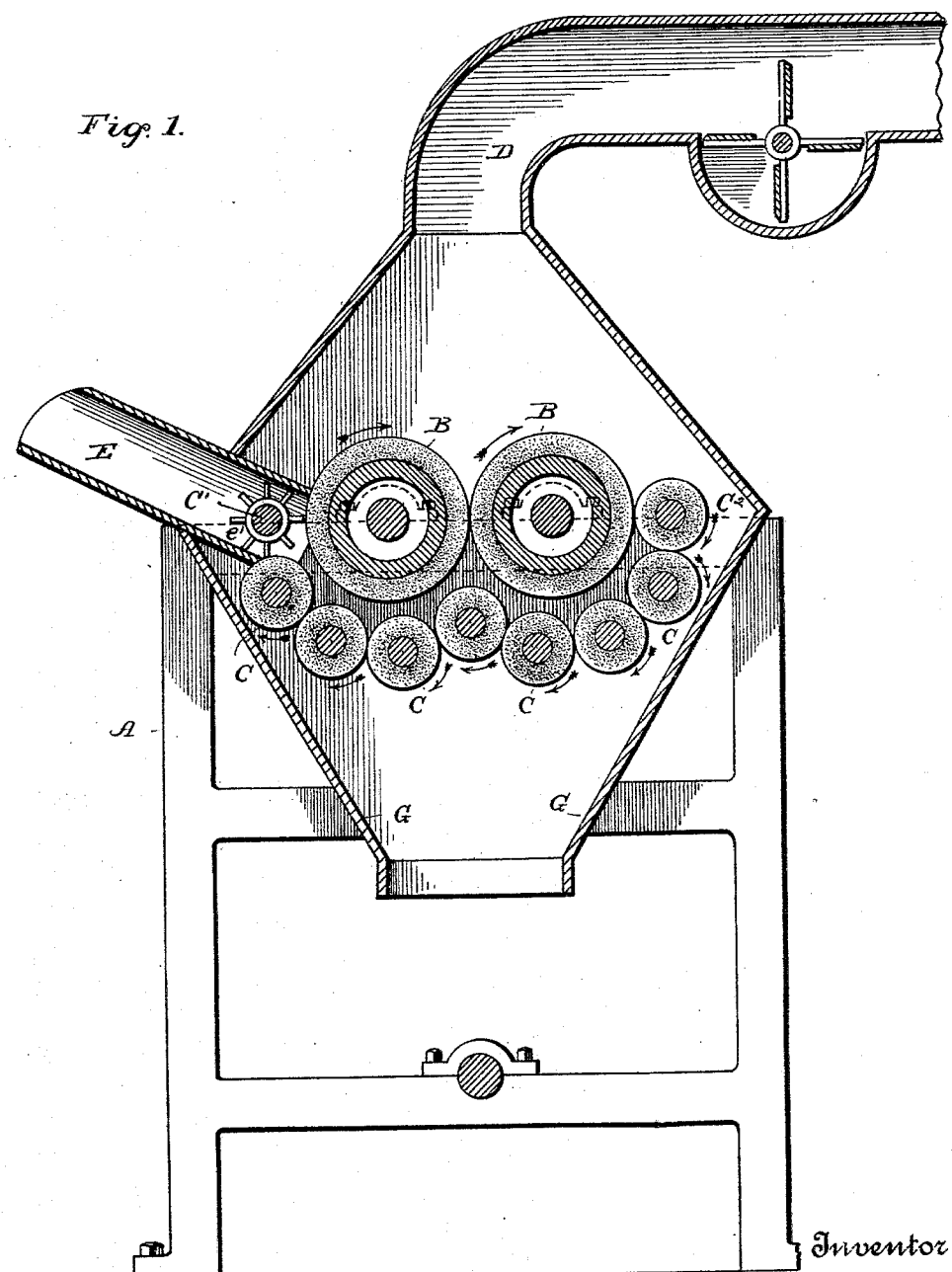

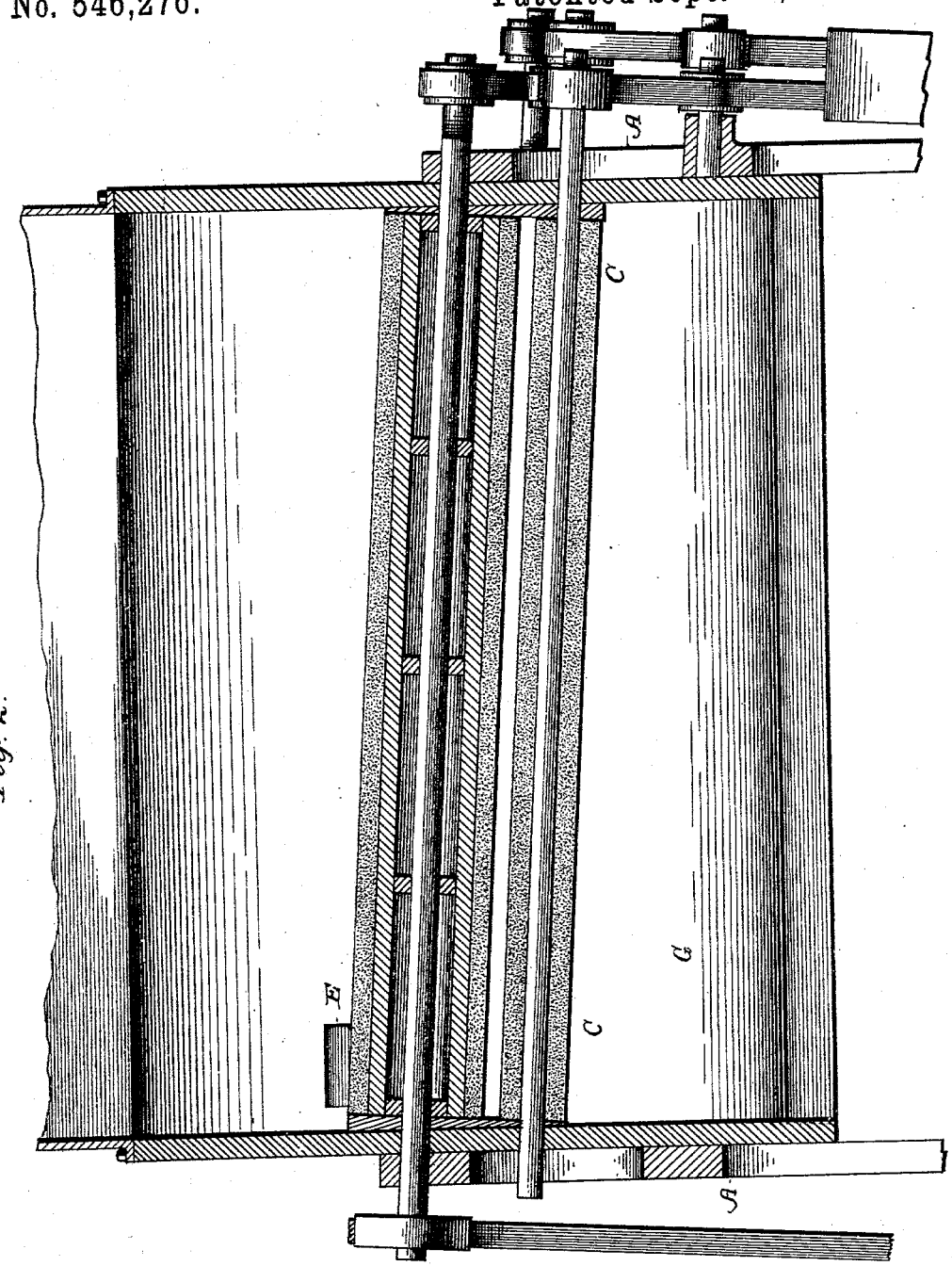

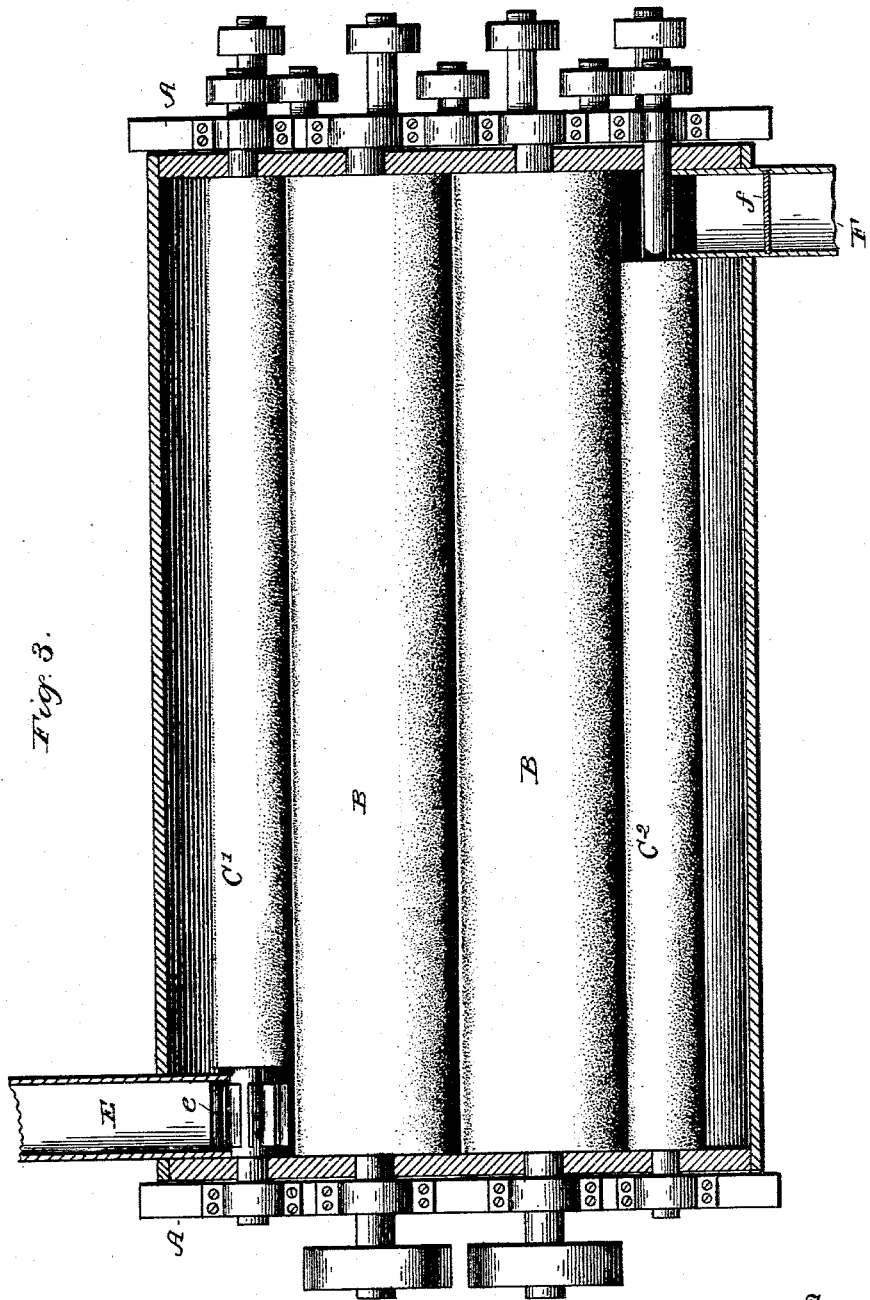

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,276, dated September 10, 1895.

Application filed June 24, 1895. Serial No. 553,888. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters"; and it consists in the improved construction and arrangement of parts, which will be hereinafter described, and particularly pointed out in the claims.

In an application for Letters Patent filed by me on June 13, 1895, Serial No. 552,686, I have described a cotton-seed delinter in which the removal of the lint from the seed under treatment takes place from the abrasion of the surface of the seed, resulting from feeding the seed into an inclosure formed by a series of positively-actuated rotating abrading-surfaces all moving in the same direction.

My present invention uses the same fundamental principle of operation as that involved in the operation of the delinter described in my above-referred-to application, namely: that when seed is subjected to the action of a series of positively-actuated rotating abrading-rolls the surfaces of which are in sufficiently close proximity to prevent discharge of seed between the same and all of which move in the same direction and means are provided for preventing the seed under treatment from falling out of the range of action of said rolls removal of the lint from the surface of the seed under treatment will take place on account of the scouring of the surface of the seed by the abrading-surfaces and the lint will be withdrawn from the inclosure in which the delinting action is taking place as the rolls complete their revolution, injury to the seed being impossible, owing to the fact that when the rolls are actuated in the manner described contiguous rotating faces move in opposite directions, and thus have no tendency to draw up between them any body of considerable size. In my present construction, instead of using a central abrading-cylinder and forming one or more abrading "pockets" around the periphery of said cylinder by a suitable arrangement of a series of smaller abrading-rolls I use for the main abrading-surface a plurality of abrading cylinders or rolls journaled in the same or substantially the same plane and arranged longitudinally. I lose, however, none of the advantages which I gained in the machine described in the above-referred-to application, and which were that the seed was constantly subjected on all sides to the action of revolving abrading-surfaces and that removal of lint and the impurities present with the seed was taking place over the whole abrading-surface, for I form the casing which I provide on one side of the series of abrading-rolls of a series of rolls similarly placed with their surfaces in sufficiently close proximity to prevent discharge of seed between the same and all rotating in the same direction. I thus feed the seed between two series of rolls, all the rolls in each series moving in the same direction, and I secure additional scouring action by causing the rolls of the two series to rotate with adjacent faces moving in opposite directions and by making the shape of the rolls forming the casing correspond to the contour of the abrading-rolls. As in my present machine I place the feed-opening at one end of the machine on one side thereof and the discharge-opening at the opposite end of the machine on the opposite side thereof, it is necessary to provide some means for feeding the seed longitudinally of the machine, so that the seed, which would in any case be carried across the abrading-surfaces by the action of the rolls of the abrading-casing rotating at a speed greater than that of the rotation of the abrading-rolls, will also be carried to the discharge-outlet. This I accomplish in my present construction by simply inclining the rolls slightly toward the discharge end of the machine, the natural gravitation of the seed resulting in its reaching the discharge-opening after its surfaces have had all the lint removed therefrom and have been polished by the action of the abrading-surfaces. It is apparent that in a machine of the general character thus specified unless some additional means were used the lint would be delivered on both sides of the machine, as the rolls forming the casing would act just as positively to remove the lint as the rolls forming the abrading-surface. I wish, however, to secure not only removal of the lint from the seed, but separation of all impurities from the lint itself, so that the lint, as it is separated from the machine, will be clean and in a marketable condition. I therefore place the entire series of abrading-rolls in the open mouth of an air-flume in which an upward current of air is caused to pass by suitable means. The lint, by reason of its extreme lightness, will cling to the surfaces of the abrading-rolls under the influence of this air-current and will be removed from the machine only by such rolls, while such impurities as leaves and bolls will be discharged downward out of the machine by the series of rolls forming the casing.

My invention is fully described in the drawings which accompany and form a part of this application, in which the same reference-letters refer to the same or corresponding parts, and in which—

Figure 1 is a central vertical section of my machine. Fig. 2 is a vertical section thereof taken on a plane running centrally through both of the rolls, forming what I term the "abrading-surface" and what I term the "casing." Fig. 3 is a plan view of the machine with the casing forming the air-flume broken away.

Referring to the drawings, A represents the machine-frame, in which are formed suitable bearings for the abrading-rolls B, only two rolls being used in this series. These rolls are placed with their surfaces in as close contact as is possible, while yet insuring independent revolution thereof and are actuated so as to move in the same direction as indicated by the arrows. The casing for the rolls is placed on the under surface thereof and consists of a series of rolls C, which are much smaller in diameter than the first series of rolls, and, therefore, when actuated by the same power-shaft which is used to impel the series of abrading-rolls B move at a much higher rate of speed. The rolls constituting the casing are placed with their surfaces in sufficiently close proximity to prevent discharges of seed between the same and are all caused to rotate in the same direction by some suitable connection to a power element. The direction of rotation of these rolls is the same as that of the first series of rolls, so that the adjacent faces of the two series of rolls move in opposite directions, thus insuring much more efficient scouring action, and in order that the rolls C' and C², which form the end rolls of the series, may rotate in such a direction as to prevent seed being drawn out of the machine between them and the abrading-rolls. The entire series of rolls is stationed in the open end of an air-flume D, in which an upward current of air is caused to exist in any suitable manner, the air passing upward between the series of rolls constituting the casing and the series of rolls constituting the abrading-surface. While I have thus termed one series of rolls as constituting the abrading-surface and the other series as constituting the casing, as they perform these respective functions it is to be understood that both forms of rolls are covered with an abrading composition, such as emery, and that both effect the removal of lint from the seed under treatment, although, as will be hereinafter shown, the lint separated by the action of the machine is all drawn upward into the air-flume, while only dirt and such coarse impurities as leaves and bolls are drawn out of the inclosure in which the action of the machine takes place by the rolls constituting the casing.

Seed is fed into the machine through the feed-spout E, the roll C' being shortened at this end of the machine and the feed taking place over its bare spindle. To insure a positive feed of the seed into the machine, I mount upon the spindle of the roll C' a conveyer-wheel $e$. This rotating conveyer device, rotating, as it does, with the roll C', acts to feed the seed positively into the machine and counteracts the tendency of the rotating surfaces, by which the seed is at once treated, to prevent forward feeding of the seed. The discharge of the seed takes place through the discharge-opening F, which is stationed at the side of the machine opposite to that at which the feed of the seed to the machine takes place and at the opposite end thereof. The discharge is effected through the space formed by shortening the roll C² at this point, as shown in the drawings, the seed being permitted to escape through the aperture thus formed by the position of the valve $f$, which controls such opening.

The feed of the seed across the series of abrading-rolls takes place simply because the series of rolls which form what I have termed the casing of the machine move at a higher rate of speed than the abrading-rolls, while the faces of the rolls which form the lower surface of the inclosure in which the delinting operation takes place move in a direction opposite to that of the direction of rotation of the corresponding faces of the abrading-rolls. While the seed is positively impelled across the machine it is necessary to provide means whereby it may be fed to the discharge end of the machine. This result I accomplish by simply placing the discharge end of the machine lower than the feed end of the machine, the inclination of the rolls being sufficient to effect the desired end.

Removal of lint from the surface of the seed under treatment takes place throughout its course of treatment in the machine, the seed being constantly subjected to revolving abrading-surfaces and the lint being rapidly removed from the surface of the same. As soon as the lint is removed from the seed it clings to the revolving faces of the rolls constituting the abrading-surfaces, because of the upward current of air which is caused to exist in the air-flume D, and is removed from the inclosure in which the delinting action is taking place as the rolls complete their revolution, being then carried upward into the air-flume and discharged at any suitable point. The loose dirt which is usually present with seed as it is fed into delinters is less subject, however, to the action of the air-current and is discharged downward into the trough formed by the inclined plates G by the rolls forming the casing of the machine as they complete their revolution.

The operation of my machine is as follows: Seed is fed into the machine through the feed-spout E, the feed being positively effected by the rotation of the conveyer-wheel e. As soon as the seed is subjected to the influence of the rotating abrading-rolls, which form the inclosure within which it is held while under treatment, the removal of the lint from the seed begins to take place, the lint being drawn upward against the surface of the upper series of rolls, which constitute what I term the "abrading-surface," by the upward air-current existing in the air-flume D, and is removed from the machine as the abrading-rolls complete their revolution, being then carried forward into the air-flume and discharged at any suitable point. Coarse dirt, such as leaves and bolls, although loose and separated from the seed, is not sufficiently subject to the influence of the air-current to be thus drawn upward, but is discharged by the revolution of the series of rolls forming the casing for the machine and falls into the trough formed by the inclined sides G. The seed is fed across the series of abrading-rolls by reason of the greater speed of revolution of the small rolls constituting the casing, and is fed toward the discharge-spout F by reason of the downward inclination of the rolls. The discharge of the seed is effected through the discharge-spout F in quantities regulated by the condition of the seed under treatment.

Having thus fully described my invention, what I claim as new, and desire to secure by Letters Patent, is—

1. In a cotton seed delinter, the combination with a series of positively-actuated abrading rolls, placed with their surfaces in sufficiently close proximity to prevent passage of seed between the same, and means for causing said rolls to rotate in the same direction, of a series of rolls, also placed with their surfaces in sufficiently close proximity to prevent passage of seed between the same, arranged to form a casing for said abrading rolls, means for causing said second series of rolls to rotate in the same direction, seed inlet and discharge openings, and means for removing the lint separated by the action of the machine, substantially as described.

2. In a cotton seed delinter, the combination with a series of positively-actuated abrading rolls, placed with their surfaces in sufficiently close proximity to prevent passage of seed between the same, and means for causing said rolls to rotate in the same direction, of a series of rolls, also placed with their surfaces in sufficiently close proximity to prevent passage of seed between the same, arranged to form a casing for said abrading rolls, means for causing said second series of rolls to rotate in the same direction, and means for causing an air current to sweep over the surface of said rolls, substantially as described.

3. In a cotton seed delinter, the combination with a series of positively-actuated abrading rolls, placed with their surfaces in sufficiently close proximity to prevent passage of seed between the same, and means for causing said rolls to rotate in the same direction, of a series of rolls, also placed with their surfaces in sufficiently close proximity to prevent passage of seed between the same, arranged to form a casing for said abrading rolls, means for causing said second series of rolls to rotate in the same direction, and at a different rate of speed than said abrading rolls, seed inlet and discharge openings, and means for removing the lint separated by the action of the machine, substantially as described.

4. In a cotton seed delinter, the combination with a series of positively-actuated abrading rolls, placed with their surfaces in sufficiently close proximity to prevent passage of seed between the same, and means for causing said rolls to rotate in the same direction, of a series of rolls, also placed with their surfaces in sufficiently close proximity to prevent passage of seed between the same, arranged to form a casing for said abrading rolls, means for causing said second series of rolls to rotate in the same direction as said abrading rolls and at a higher rate of speed, seed inlet and discharge openings, and means for removing the lint separated by the action of the machine, substantially as described.

5. In a cotton seed delinter, the combination with a series of positively-actuated abrading rolls, placed with their surfaces in sufficiently close proximity to prevent passage of seed between the same, and means for causing said rolls to rotate in the same direction, of a series of rolls, smaller in diameter than said abrading rolls, also placed with their surfaces in sufficiently close proximity to prevent passage of seed between the same, arranged to form a casing for said abrading rolls conforming to the contour thereof, means for rotating said casing rolls at a higher rate of speed than said abrading rolls, seed inlet and discharge openings, and means for causing an air current to sweep over the surface of said rolls, substantially as described.

6. In a cotton seed delinter, the combination with a plurality of horizontally-arranged, positively-actuated abrading rolls, placed with their surfaces in sufficiently close proximity to prevent passage of seed between the same, and means for causing said rolls to rotate in the same direction, of a series of rolls, smaller in diameter than said abrading rolls, also placed with their surfaces in sufficiently close proximity to prevent passage of seed between the same, and arranged to form a casing for the lower face of said abrading rolls conforming to the contour thereof, means for causing said casing rolls to rotate at a higher rate of speed than said abrading rolls, seed inlet and discharge openings, and means for causing an upward air current to sweep over said rolls, substantially as described.

7. In a cotton seed delinter, the combination with a plurality of horizontally-arranged, positively-actuated abrading rolls, placed with their surfaces in sufficiently close proximity to prevent passage of seed between the same, of a series of rolls, smaller in diameter than said abrading rolls, also placed with their surfaces in sufficiently close proximity to prevent passage of seed between the same, and arranged to form a casing for said abrading rolls conforming to the contour thereof, the end rolls of said casing rolls being placed sufficiently close to the abrading rolls to prevent discharge of seed, means for causing said abrading and casing rolls to rotate in the same direction, but at different speeds, seed inlet and discharge openings, and means for causing an upward air current to sweep over said rolls, substantially as described.

8. In a cotton seed delinter, the combination with a plurality of horizontally-arranged, positively-actuated abrading rolls, placed with their surfaces in sufficiently close proximity to prevent passage of seed between the same, of a series of rolls, smaller in diameter than said abrading rolls, also placed with their surfaces in sufficiently close proximity to prevent passage of seed between the same, and arranged to form a casing for said abrading rolls conforming to the contour thereof, the end rolls of said casing rolls being placed sufficiently close to the abrading rolls to prevent discharge of seed, and portions of said rolls at opposite ends of the machine being reduced in diameter to form inlet and discharge openings, means for causing said abrading and casing rolls to rotate in the same direction, but at different speeds, and means for causing an upward air current to sweep over said rolls, substantially as described.

9. In a cotton seed delinter, the combination with a plurality of horizontally-arranged, positively-actuated abrading rolls, placed with their surfaces in sufficiently close proximity to prevent discharge of seed between the same, said rolls being journaled so that one end thereof is higher than the other, of a series of rolls, smaller in diameter than said abrading rolls, also placed with their surfaces in sufficiently close proximity to prevent passage of seed between the same, and arranged to form a casing for said abrading rolls conforming to the contour thereof, the end rolls of said casing rolls being placed sufficiently close to the abrading rolls to prevent discharge of seed, and portions of said rolls at opposite ends of the machine being reduced in diameter to form inlet and discharge openings, means for causing said abrading and casing rolls to rotate in the same direction, but at different speeds, and means for causing an upward air current to sweep over said rolls, substantially as described.

In testimony whereof I affix my signature in presence of two witnesses.

JAMES J. FAULKNER.

Witnesses:
R. W. RAMSEY,
JOHN HALLUM.